United States Patent [19]
Hatano et al.

[11] Patent Number: 5,452,110
[45] Date of Patent: Sep. 19, 1995

[54] COMPACT FACSIMILE APPARATUS WITH IMPROVED COMPONENT ARRANGEMENT

[75] Inventors: Yasuhiro Hatano, Ebina; Hajime Takayama; Yasushi Fukada, both of Yokohama; Kazuhiko Kurita, Odawara; Kazuo Nojiri, Yokohama, all of Japan

[73] Assignee: Matsushita Graphic Communication Systems, Inc., Tokyo, Japan

[21] Appl. No.: 229,879

[22] Filed: Apr. 19, 1994

[30] Foreign Application Priority Data

Apr. 21, 1993 [JP] Japan .................. 5-094426
Jul. 14, 1993 [JP] Japan .................. 5-174079
Jul. 30, 1993 [JP] Japan .................. 5-190020

[51] Int. Cl.$^6$ .............. H04N 1/10; H04N 1/12; H04N 1/23
[52] U.S. Cl. .................. 358/494; 358/496; 358/498; 358/296
[58] Field of Search ............. 358/498, 496, 494, 488, 358/296

[56] References Cited

U.S. PATENT DOCUMENTS 4,205,349  5/1980  Kawazu et al. .............. 358/496
5,179,454  1/1993  Shinada .................. 358/498

Primary Examiner—Scott A. Rogers
Attorney, Agent, or Firm—Lowe, Price, LeBlanc & Becker

[57] ABSTRACT

A facsimile apparatus is provided which includes a casing, a system control unit for controlling a facsimile operation, an optical system, reading facsimile data of a transmit document, arranged below the system control unit within the casing, and a document feeding path, provided above the system control unit, for feeding the transmit document to a reading station where the optical system reads the facsimile data of the transmit document. These arrangements provide a compact structure of the facsimile apparatus.

15 Claims, 10 Drawing Sheets

COMPACT FACSIMILE APPARATUS WITH IMPROVED COMPONENT ARRANGEMENT

BACKGROUND OF THE INVENTION

1. Technical Field of the Invention

The present invention relates generally to a facsimile apparatus, and more particularly to improved arrangements of facsimile component parts within a casing for providing a compact structure of a facsimile apparatus.

2. Background Art

A known facsimile apparatus has disposed on a bottom surface, a side surface, or a rear surface a control board on which electronic parts are mounted for assuring space enough to feed a transmit document and a recording paper sheet to an image reading station and to an image recording station, respectively. The control board, facsimile component parts arranged at some places within a casing, sensors, a recording head, and so forth are electrically connected using harnesses. Therefore, space is required for arranging the harnesses within the casing, which will encounter a difficulty in reducing the size of the facsimile apparatus.

SUMMARY OF THE INVENTION

It is therefore a principal object of the present invention to avoid the disadvantages of the prior art.

It is another object of the present invention to provide a compact facsimile apparatus which utilizes an internal space effectively and may be manufactured at economic cost levels.

According to one aspect of the present invention, there is provided a facsimile apparatus which comprises a casing, a control unit, disposed within the casing, for controlling a facsimile operation, an optical system reading facsimile data of a transmit document, the optical system being arranged below the control unit within the casing, and a document feeding path, provided above the control unit, for feeding the transmit document to a reading station where the optical system reads the facsimile data of the transmit document.

According to another aspect of the present invention, there is provided a facsimile apparatus which comprises a casing, a control board, arranged within the casing, for pivotably supporting a recording head, a recording paper feeding path, defined above the control board, for feeding a sheet of recording paper, and a recording roller urging the sheet of recording paper traveling along the recording paper feeding path against the recording head.

According to a further aspect of the invention, there is provided a facsimile apparatus which comprises a casing, a control board arranged within the casing, a paper feeding path, defined above the control board, for feeding a sheet of paper, and a detecting means, provided on the control board, for detecting the presence of the sheet of paper traveling along the paper feeding path.

According to a further aspect of the invention, there is provided a facsimile apparatus which comprises a casing, a base plate having a control board disposed on a lower portion thereof, a moving means, arranged on the base plate, for moving in response to movement of an opening and closing member which opens and closes the casing and to traveling of a sheet of paper along a paper feeding path, and a detecting means, responsive to the movement of the moving means, for detecting position of the opening and closing member and the presence of the sheet of paper on the paper feeding path.

According to a further aspect of the invention, there is provided a facsimile apparatus which comprises a casing, a control board disposed within the casing, a cover, arranged above the control board, movable between an opening position for opening the casing and a closing position for closing the casing, and a detecting means, arranged on the control board, for detecting position of the cover.

According to a further aspect of the invention, there is provided a facsimile apparatus which comprises a casing, a unit including a base plate having disposed thereon a preselected component part of the facsimile apparatus and a control board on which a preselected electronic part associated with the component part of the facsimile apparatus, an optical system reading facsimile data of a transmit document, the optical system being arranged below the unit within the casing, and a document feeding path, provided above the unit, for feeding the transmit document to a reading station where the optical system reads the facsimile data of the transmit document.

According to a further aspect of the invention, there is provided a facsimile apparatus which comprises a casing, a handset arranged on a side of the casing, a network control section disposed adjacent the handset within the casing, and a power supply section disposed opposite the network control section within the casing.

According to a further aspect of the invention, there is provided a facsimile apparatus which comprises a casing, a handset arranged on a side of the casing, a network control section disposed adjacent the handset within the casing, a power supply section disposed opposite the network control section within the casing, and a control board arranged above the network control section and the power supply section, the control board including an analog signal control section arranged adjacent the network control section, a driving control section, arranged adjacent the power supply section, for driving a preselected electric part, and a digital signal control section arranged between the analog signal control section and the driving control section.

According to a further aspect of the invention, there is provided a facsimile apparatus which comprises a casing, a network control section disposed on a bottom plate of the casing, a power supply section disposed on the bottom plate of the casing, a control board arranged above the network control section and the power supply section, first pair of connectors secured on the network control section and the control board, respectively for establishing electric communication between the network control section and the control board, and second pair of connectors secured on the power supply section and the control board, respectively for establishing electric communication between the power supply section and the control board.

According to a further aspect of the invention, there is provided a facsimile apparatus which comprises a casing, a metallic bottom plate, a metallic base plate above the bottom plate at a preselected interval therebetween, a transmit document feeding means arranged above the base plate for feeding a transmit document along a document feeding path, and a control unit arranged between the base plate and the bottom plate for controlling operation of the facsimile apparatus.

According to a further aspect of the invention, there is provided a facsimile apparatus which comprises a casing, a roller for feeding a recording paper sheet, an opening and closing member for opening and closing the casing, the opening and closing member rotatably supporting the roller, and an engaging member arranged within the casing, the engaging member rotatably retaining the roller in a preselected position when the opening and closing member is closed.

According to a further aspect of the invention, there is provided a facsimile apparatus which comprises a casing, a roller for feeding a recording paper sheet, an openable storage portion for storing the recording paper sheet, the openable storage portion rotatably supporting the roller, an engaging member arranged within the casing, the engaging member rotatably retaining the roller in a preselected position when the openable storage portion is closed, a recording head urged against the roller retained by the engaging member, a control board rotatably supporting the recording head, and a base plate supporting the control board on a lower portion thereof, the base plate having the engaging member disposed on an upper portion thereof.

According to a still further aspect of the invention, there is provided a facsimile apparatus which comprises a casing, a roller for feeding a recording paper sheet, an openable storage portion for storing the recording paper sheet, the openable storage portion rotatably supporting the roller, an engaging member arranged within the casing, the engaging member including a protrusion retaining the roller in a preselected position when the openable storage portion is closed, and a recording head retained to urge the roller against the engaging member.

According to a yet further aspect of the invention, there is provided a facsimile apparatus which comprises a casing, a recording roller pressing a recording paper sheet against a recording head, an openable storage portion for storing the recording paper sheet, the openable storage portion rotatably supporting the recording roller, and an engaging member arranged within the casing, the engaging member including an engaging surface retaining the recording roller in engagement with the recording head and an inclined surface guiding the recording roller toward the engaging surface when the openable storage portion is being closed.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
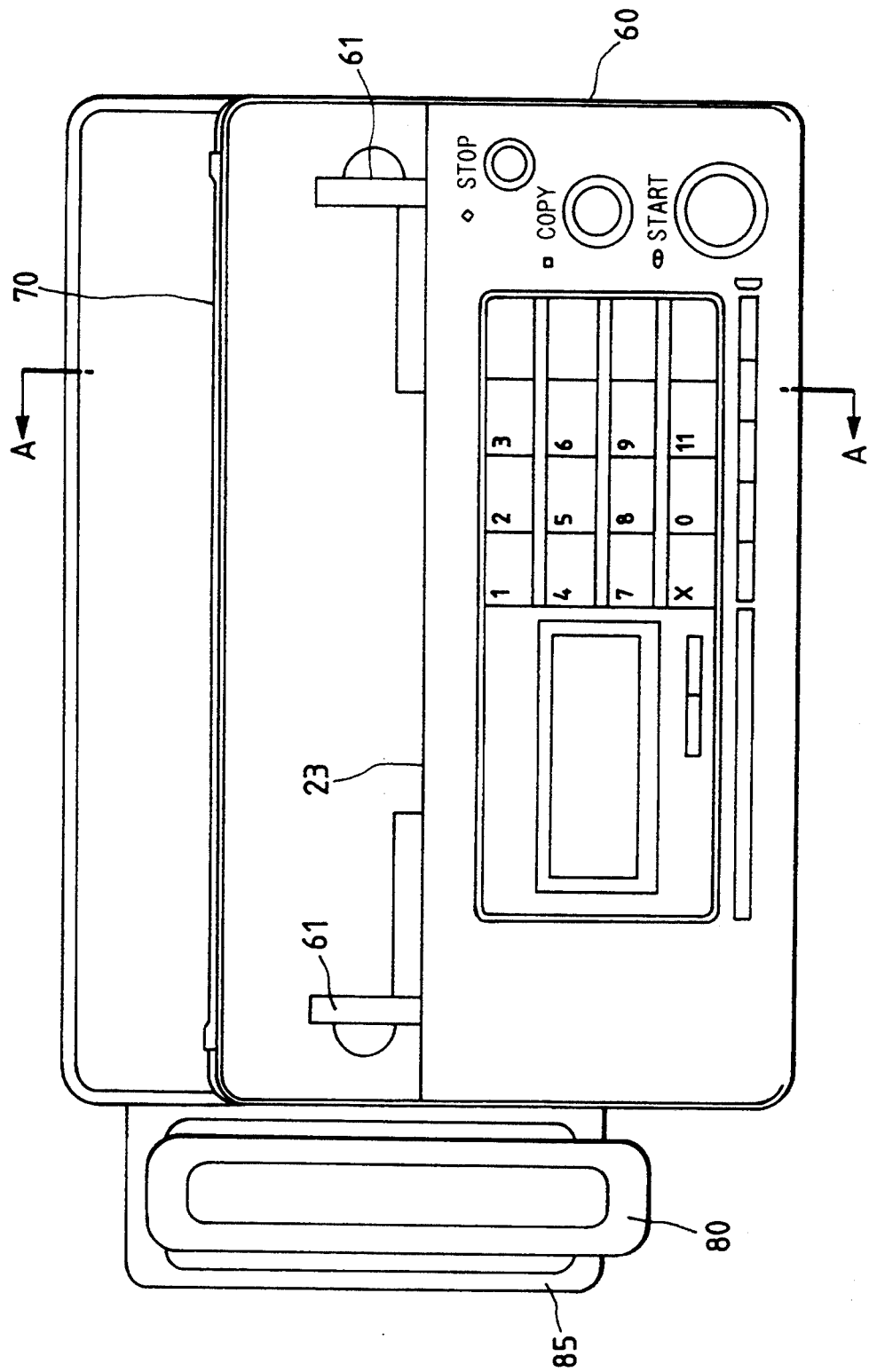
FIG. 1 is a plan view which shows a facsimile apparatus according to the present invention.
Figure 2:
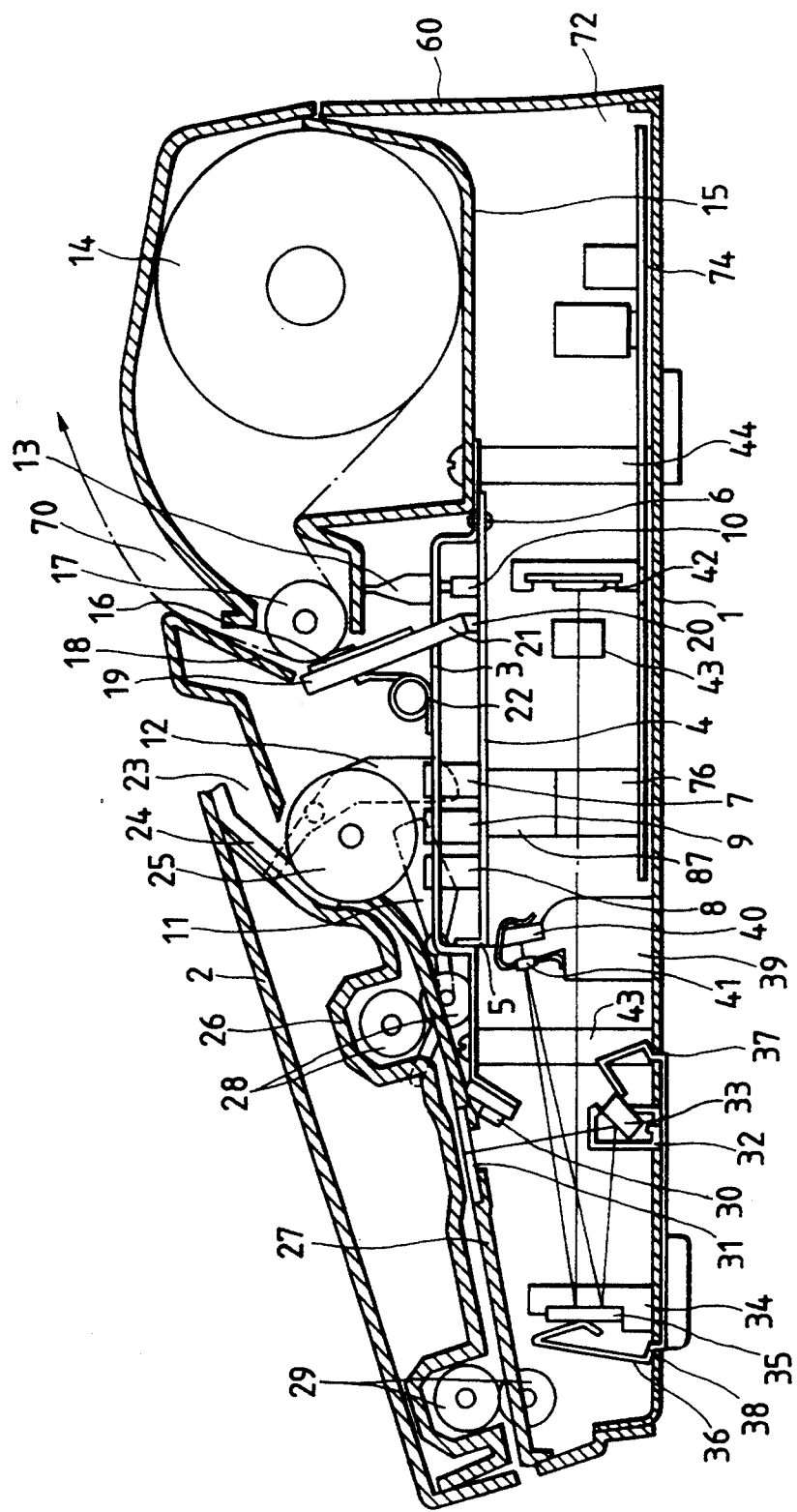
FIG. 2 is a cross-sectional view taken along the line A—A in FIG. 1.

Referring now to the drawings, wherein like numbers refer to like parts in several views, particularly to FIGS. 1 and 2, there is shown a facsimile apparatus according to the present invention.

The facsimile apparatus includes generally a transmit document guides 61 guiding a transmit document into a document inlet 23, and a handset 80, and a handset table 85 secured on a side of a casing 60.

Internally, the facsimile apparatus includes a metallic bottom plate 1, resin-made manually-openable covers 2 and 49, a metallic chassis or base plate 3, optical document sensors 7 and 8, optical cover sensors 9 and 10, and actuators 11, 12, and 13.

The base plate 3 is supported by supports 43 and 44 in the central area of the apparatus and projects in a direction of transmission of documents. On the base plate 3, a system control board 4 which controls a system operation of the facsimile apparatus is mounted through claw 5 and vises 6. The optical document sensor 7 is installed directly on the system control board 4 for optically monitoring the presence of the transmit document on which transmit facsimile data are printed. The optical document sensor 8 is also attached directly on the system control board 4 for optically detecting the presence of the transmit document. The cover sensor 9 monitors position of the cover 2 covering a facsimile data reading system. The cover sensor 10 monitors position of the cover 49 covering a facsimile data recording system. The actuator 11, as will be described in detail later, activates the optical document sensor 8 when the document exists on a document feeding path, while activating the cover sensor 9 when the cover 2 of the facsimile data reading system is open. The actuator 12 activates the document sensor 7 when there is the document on the document feeding path. In addition, the actuator 13 activates the cover sensor 10 to monitor whether the cover 49 of the facsimile data recording system is open or closed.

A roll of recording paper 14 is stored in a paper holder 15. The recording paper 14, as shown by a broken line, travels between a recording head 16 and a recording roller 17 along a given path of travel for recording the facsimile data thereon and then is discharged outside the apparatus through a recorded paper outlet 70. The recording head 16 is mounted on a recording substrate 18 which is secured to a head mounting member 19. The head mounting member 19 is pivotably supported by a shaft 21 and a retainer (not shown)

in electric communication with the system control board 4 through a connector 20. A spring 22 is mounted on the base plate 3 to provide a biasing force to the head mounting member 19 for urging the recording head 16 against the recording roller 17.

Transmit documents are inserted into the facsimile apparatus through the document inlet 23. The transmit documents are then separated in sequence by a paper separating member 24 and an automatic paper-feeding roller 25 to be fed by a feeding roller 28 to a reading station of the facsimile data reading system along the document feeding path defined by guide plates 26 and 27. After having been optically read by the facsimile data reading system at the reading station, the transmit documents are ejected in sequence by ejecting rollers 29 out of the facsimile apparatus.

The facsimile data reading system is, as can be seen in FIG. 2, arranged beneath the system control board 4, and includes a light source 30, mirrors 33, 35, and 40, a converging lens 43, and a charge coupled device (CCD) 42.

The light source 30 is arranged on an end portion of the base plate 3 and emits light toward the transmit document traveling on a reading glass 31. The reflected light from the transmit document is then reflected on a mirror 33 supported by a stationary member 32 formed on the bottom plate 1 using the outsert forming process, for example, and is also reflected by the mirror 35 secured on a stationary member 34. A leaf spring 36 is secured on a lower surface of the bottom plate 1 with its both end portions being inserted thereinto to retain the mirrors 33 and 35 on the stationary members. The leaf spring 36 has engaging portions 37 and 38 which are designed to engage the bottom plate 1 tightly once inserted thereinto for holding the leaf spring 36 from being dislodged easily.

The light reflected by the mirror 35 is reflected again on the mirror 40 secured by a spring 41 on a stationary member 39 formed on the bottom plate 1 and then enter a CCD 42 through the converging lens 43. The CCD 42 may either be connected to the system control board 4 using a harness (not shown) or mounted directly on a lower surface of the system control board 4.

Figure 3:
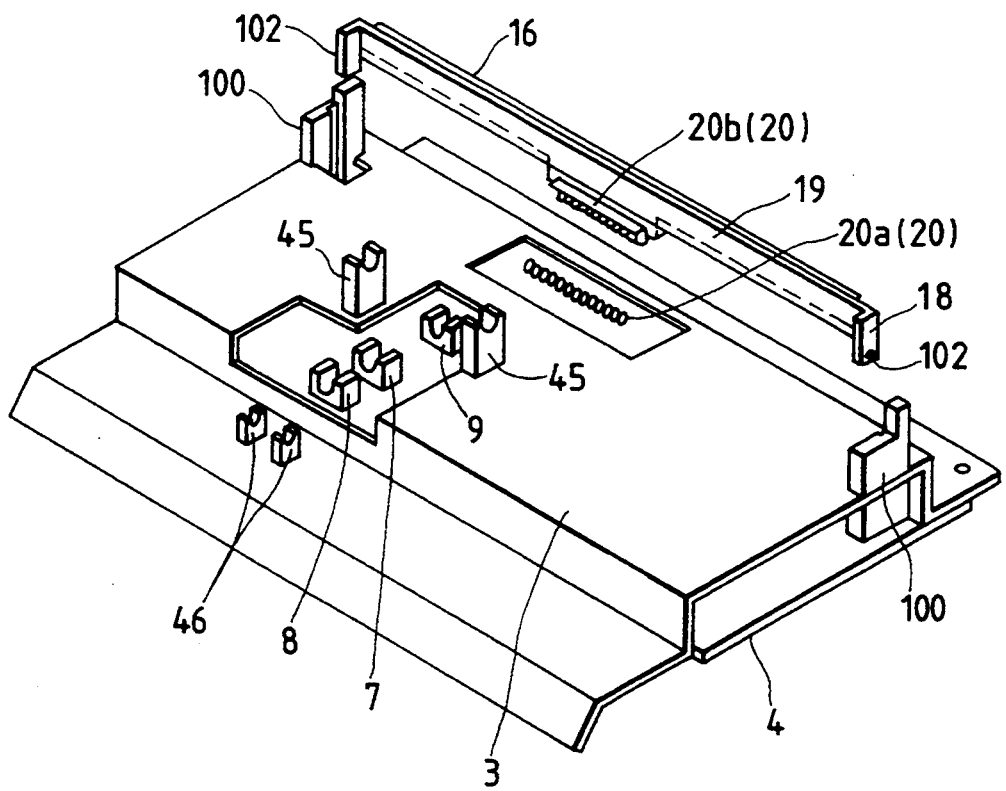
FIG. 3 is a perspective view which shows a system control board of a facsimile apparatus.

Referring to FIG. 3, a connector 20a is mounted directly on the system control board 4 and exposed upward, as seen from the drawing, through an opening formed in the base plate 3. A connector 20b is secured on the head mounting member 19 having disposed thereon the recording substrate 18 for electrically connecting the recording head 16 with the system control board 4 through the connector 20a. A pair of bearings 45 are formed on the base plate 3 to pivotably support the actuator 12. In addition, a pair of bearings 46 are formed on a stepped portion of the base plate 3 for pivotably supporting the actuator 11.

Figure 11:
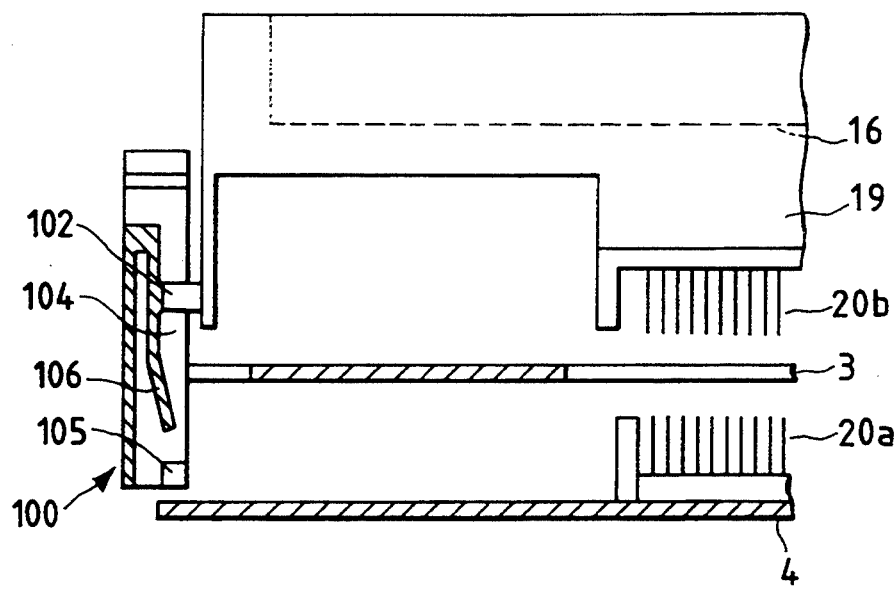
FIG. 11 is a partial diagrammatic view which shows a head mounting member and a system control board before assembling.
Figure 12:
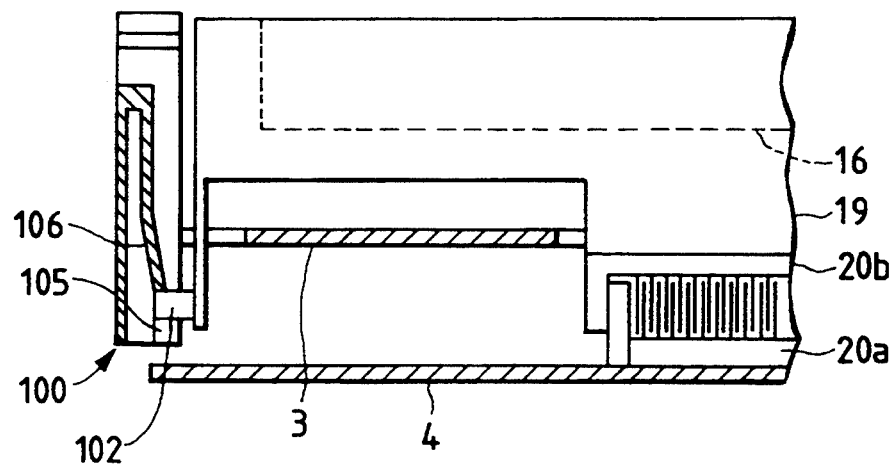
FIG. 12 is a partial diagrammatic view which shows a head mounting member and a system control board which have been assembled completely.

The connectors 20a and 20b, as clearly from FIGS. 11 and 12, have a plurality of conductive fins, respectively which slidably engage each other for establishing electric communication therebetween while allowing the head mounting member 19 to swing about the shaft 21.

The operations of the sensors 7, 8, 9, and 10 will be discussed below with reference to FIGS. 4 to 6.

A stopper 47 is attached to the cover 2 of the facsimile data reading system through the guide plate 26, while a stopper 48 is fixed on the cover 49 of the facsimile data recording system. The cover 49 is pivotably supported by a shaft 50.

Figure 4:
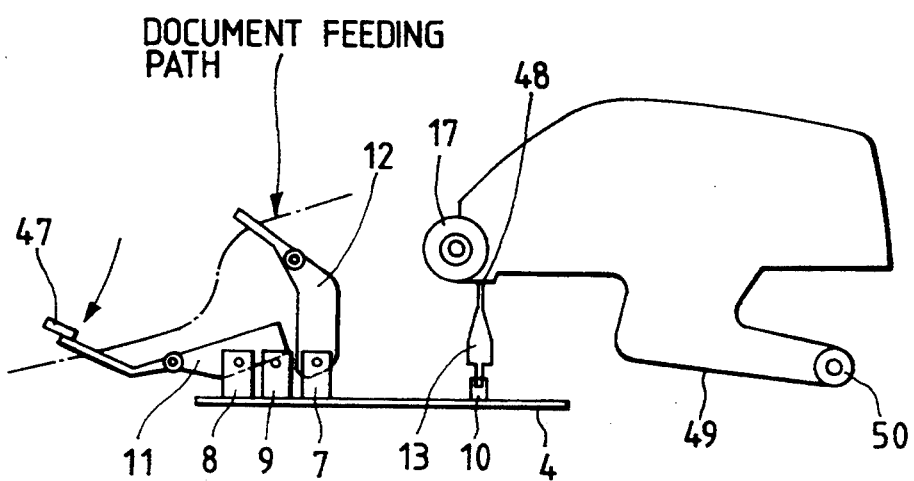
FIGS. 4, 5, and 6 are illustrations which show positions of actuators activating document sensors and cover sensors.

In FIG. 4, no transmit document travels along the document feeding path and the covers 2 and 49 are both closed. The actuator 11 is, as apparent from the drawing, held by the stopper 47 of the cover 2 at a location where an end of the actuator 11 engaging the stopper 47 projects into the document feeding path to block it. Similarly, the actuator 12 partially projects into the document feeding path to block it. The document sensors 7 and 8 thus, detect the actuators 12 and 11, respectively to provide sensor signals (ON signals) indicating that no transmit document travels along the document feeding path. On the other hand, the cover sensor 9 does not detect the actuator 11 to provide a sensor signal (OFF signal) representing that the cover 2 is closed.

Figure 5:
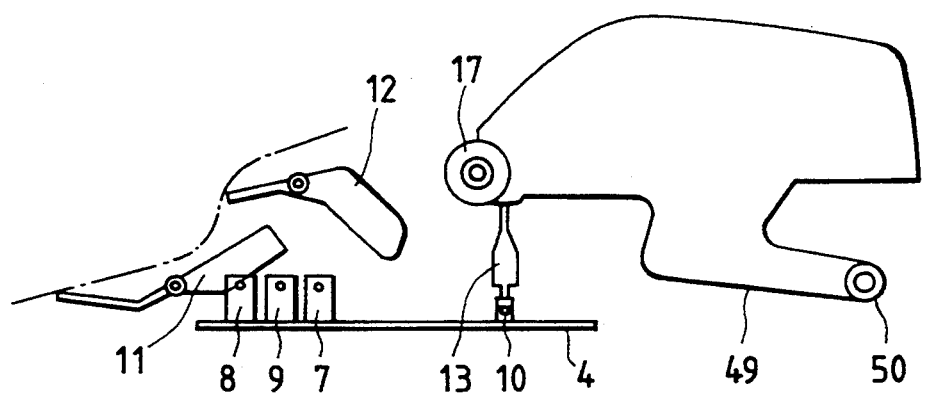

When the transmit document travels along the document feeding path, it will cause the actuators 11 and 12 to experience a counterclockwise rotation, as shown in FIG. 5, so that they move away from the sensors 7, 8, and 9. Therefore, the document sensors 7 and 8 do not detect the actuators 12 and 11 and provide sensor signals (OFF signals) indicating that the transmit document is moving along the document feeding path. In addition, the cover sensor 9 also does not detect the actuator 11 to provide a sensor signal (OFF signal) indicative of the cover 2 being closed.

Figure 6:
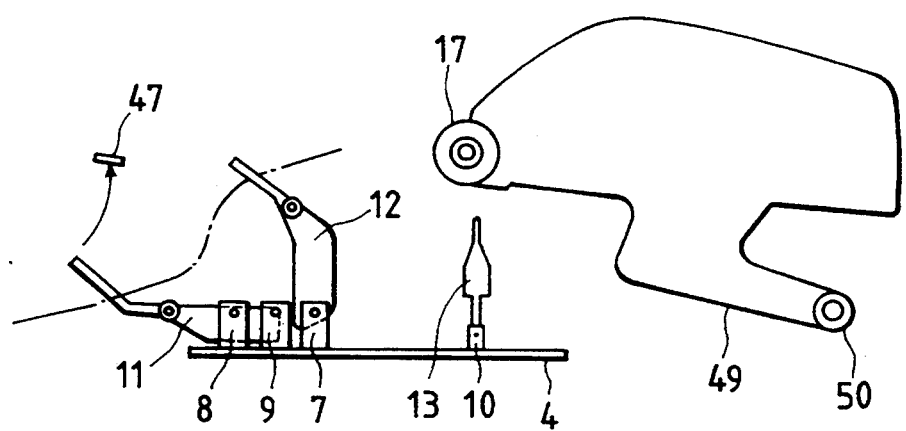

When no transmit document travels along the document feeding path and the covers 2 and 49 are both opened, as shown by arrows in FIG. 6, the stopper 47 attached to the cover 2 moves away from the actuator 11, the stopper 48 provided on the cover 49 is also lifted away from the actuator 13, and the actuator 12 is returned back to its vertical position. Thus, the document sensors 7 and 8 both detect the actuators 12 and 11 to provide the sensor signal (ON signal) indicating that no transmit document is traveling along the document feeding path, the cover sensor 9 detects the actuator 11 to provide the sensor signal (ON signal) indicating that the cover 2 is open, and the cover sensor 10 outputs a sensor signal (OFF signal) representing that the cover 49 is open.

Figure 7:
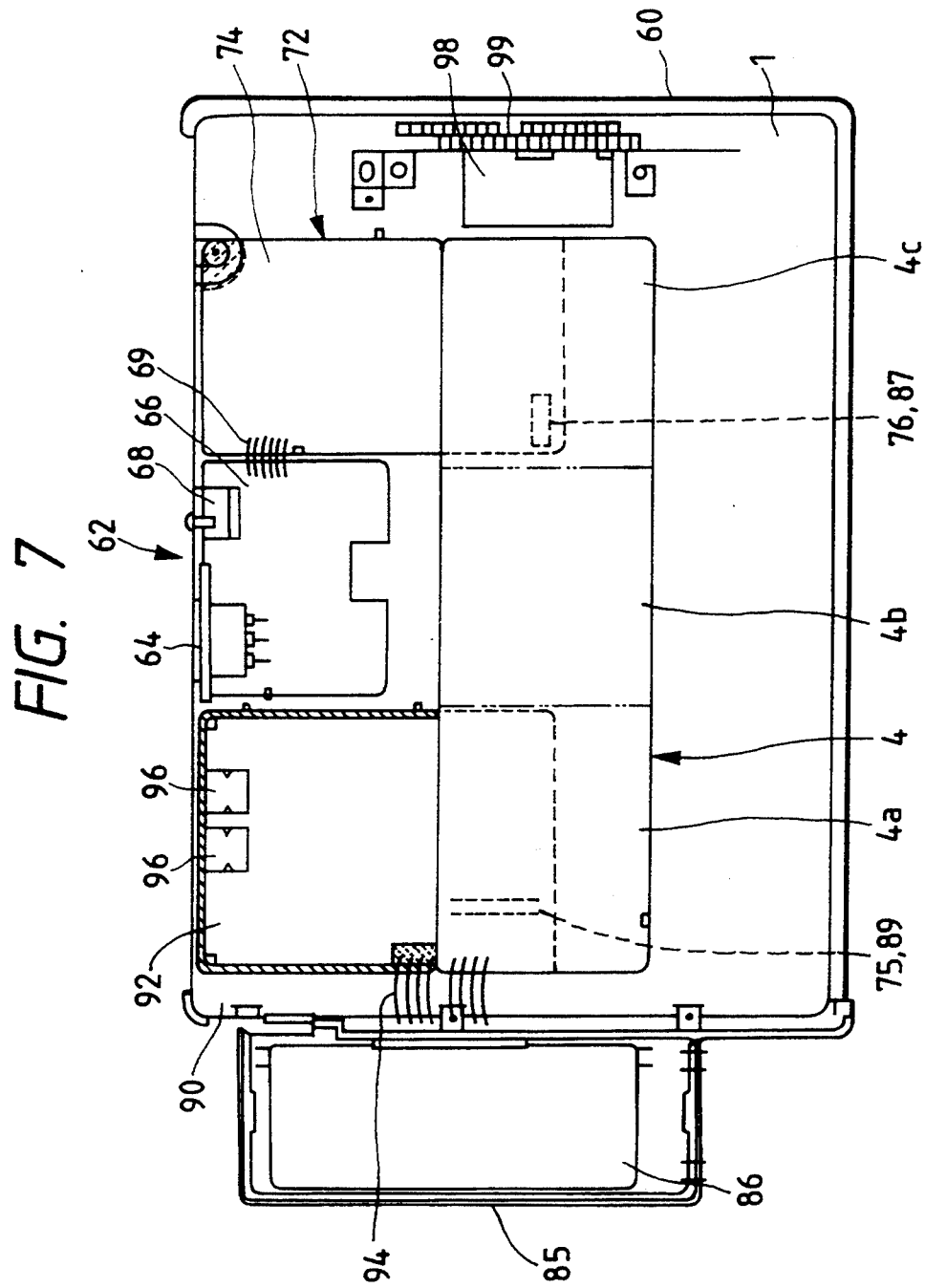
FIGS. 7 and 8 are plan views which show circuit arrangements within a casing of a facsimile apparatus.
Figure 8:
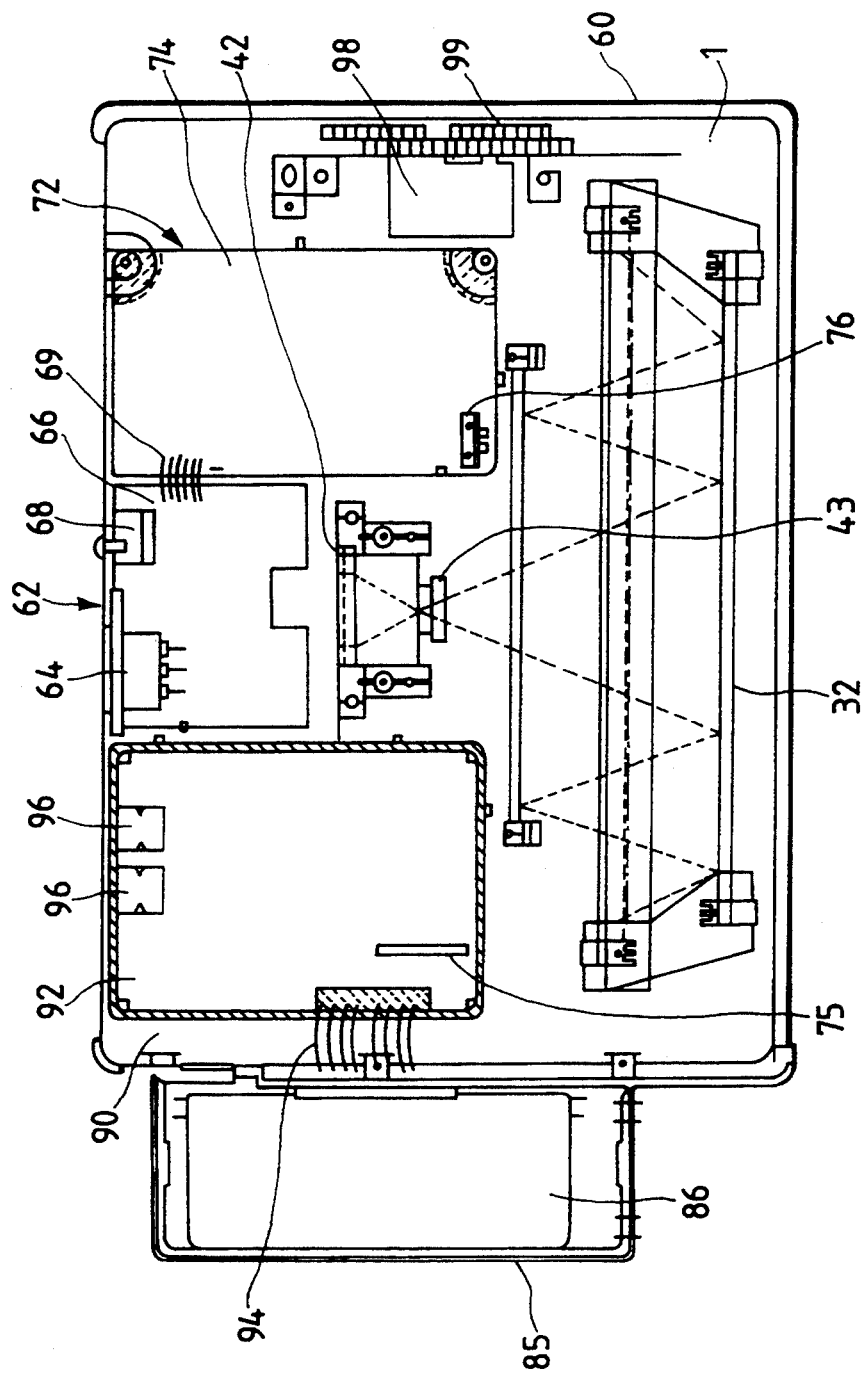

Referring to FIGS. 7 and 8, there is shown a network control section 90 which includes a circuit board 92 having disposed thereon conventional electronic parts necessary for facsimile communication.

The network control section 90 arranged on the bottom plate 1 in the vicinity of the handset control board 86 in electric communication therewith through a harness 94. On the circuit board 92, a connector 75 connected to the system control board 4 is arranged on a front end portion and a pair of connectors 96 connected to telephone lines are mounted on a rear end portion.

An electric motor 98 and a gear grain 99 are mounted on the bottom plate 1 for mechanically driving the ejecting rollers 29, the paper-feeding roller 25, and the recording roller 17. The electric motor 98 is, as clear from the drawing, arranged opposite the handset control board 86 and the network control section 90 so that it does not interfere therewith.

A power supply section 72 is located on the bottom plate 1 beneath the sheet holder 15. The power supply section 72 includes a power circuit board 74 having disposed thereon a transformer or so forth (not shown). The power supply section 72 is arranged adjacent the electric motor 98 so that it also does not interfere with the handset control board 86 and the network control section 90. A connector 76 is mounted on a front end portion of the power circuit board 74 for connection with the system control board 4.

A power supply-connecting section 62 is arranged between the network control section 90 and the power supply section 72 on the bottom plate 1, and includes a circuit board 66 having disposed thereon a power switch 68, a harness connector 64, and a fuse (not shown). The power supply-connecting section 62 is electrically connected to the power supply section 72 through a harness 69. The electric parts (i.e., the power switch 68, the harness connector 64, and the fuse) mounted on the power supply-connecting section 62 usually do not raise noise which will affect operation of the network control section 90. Therefore, the power supply-connecting section 62, if arranged adjacent the network control section 90, does not interfere therewith.

The system control board 4 is, as can be seen in FIG. 7, of generally rectangular configuration extending in a widthwise direction of the casing 60. The system control board 4 has disposed on a lower surface thereof connectors 89 and 87 which establish electric communication with the network control section 90 and the power supply section 72 through the connectors 75 and 76. In general, a system control circuit of a facsimile apparatus electrically communicates with a network control circuit and a power supply using cables and/or harnesses which will radiate a large amount of electromagnetic wave therearound. In the circuit arrangements of the present invention, the system control board 4 is arranged above the network control section 90 and the power supply section 72 in electric communication therewith through the connectors 75, 89, 76, and 87 without use of such as long and fine cables. This results in greatly reduced radiation of the electromagnetic wave.

The system control board 4 includes three sections 4a, 4b, and 4c arranged in a lengthwise direction. The section 4a is arranged above the network control section 90 and has disposed thereon circuits handling analog signals and the like which constitute an analog signal control section. The section 4b is disposed above the power supply-connecting section 62 and has disposed thereon circuits handling digital signals and so forth which constitute a digital signal control section. In addition, the section 4c is arranged above the power supply section 72 and has disposed thereon circuits for driving the electric motor 98, a solenoid (not shown) stamping a mark on transmit documents, in sequence, indicating that transmit data printed on the transmit documents have been read securely, circuits for AC.DC converters, and some parts associated with these circuits. These constitute a driving control section.

In general, unwanted electric disturbance or noises affect analog signals more than digital signals. Therefore, in the circuit arrangements of the system control board 4 of the invention, the analog signal control section 43a is arranged most away from the electric motor 98 and the power supply section 72 which will cause the electric noises. It is preferable that the analog signal control section 43a be located more than 40 mm away from the electric motor 98 and the power supply section 72. In addition, the driving control section 4c may raise the electric noises, however, the analog signal control section 43a is also away from the driving control section 4c so that it is hardly interfered by the driving control section 4c. The digital signal control section 4b is arranged in the central area nearer to the electric motor 98, the power supply section 72 and the driving control section 3c than the analog signal control section 4a since it is not much affected by the electric noises. Further, some of the parts mounted on the system control board 4 which may cause noise are arranged on the driving control section 4c away from the handset control board 86 and the network control section 90 so that they do not interfere with the handset control board 86 and the network control section 90.

In addition, the system control board 4, the power supply section 72, and the network control section 90 are, as seen from FIG. 2, located between the base plate 3 and the bottom plate 1. The base plate 3 and the bottom plate 1 are made of a metallic material which functions as an electromagnetic wave shielding member for reducing the amount of electromagnetic wave radiated outside from the system control board 4.

Figure 9:
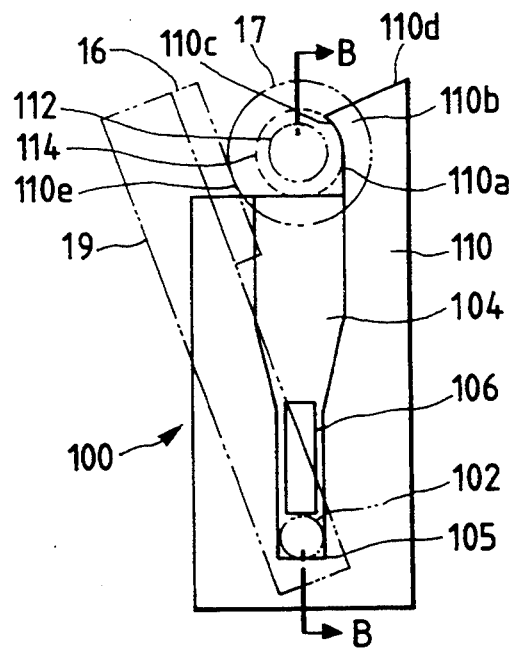
FIG. 9 is a side view which shows a bearing member rotatably supporting a recording head and a recording roller.

Referring to FIG. 9, there is shown a mounting structure for the recording head 16.

The head mounting member 19, as shown in FIG. 3, on which the recording head 16 is mounted, has a pair of rotational pins 102 in alignment with each other on its both end portions. A pair of resin-made bearing members 100 are installed on both sides of the base plate 3. It is advisable that the bearing members 100 be formed on the base plate 3 using the outsert forming process for assuring positioning accuracy and reducing manufacturing processes.

Figure 10:
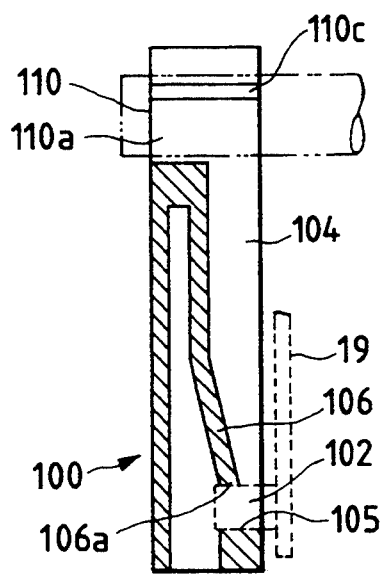
FIG. 10 is a cross-sectional view taken along the line B—B in FIG. 9.

Each of the bearing members 100, as shown in FIGS. 9 and 10, includes a guiding groove 104 for guiding vertical insertion of the rotational pins 102 of the head mounting member 19, a bearing surface 105 formed in a lower end portion of the guiding groove 104, and a claw 106 formed on a bottom surface of the guiding groove 104. The claw 106, as shown in FIG. 10, has its lower end inclined outward, while it is elastically deformable to permit the rotational pin 102 to be displaced downward along the guiding groove 104 into tight engagement with the bearing surface 105. Once each of the rotational pin 102 engages the bearing surface 105, it is retained in its place by a lower surface 106a of the claw 106 for rotatably supporting the head mounting member 19.

The recording head 16 is, as explained above, electrically connected to the system control board 4 through the connectors 20a and 20b.

The mounting the head mounting member 19 on the bearing members 27 and the engagement of the connector 20b with the connector 20a are, as shown in FIG. 11, accomplished by first orienting the head mounting member 19 parallel to the base plate 3 and the system control board 4 and then fitting the rotational pins 102 into the guiding grooves 28 of the bearing members 27. As the rotational pins 102 are pushed downward, it will cause the claw 106 to be deformed inwardly for allowing the rotational pins 102 to engage the bearing surface 105, as shown in FIG. 12. At the same time, the connector 20b electrically engage the connector 20a. As can be seen from FIG. 12, the rotational pins 102 and the connectors 20a and 20b engaged are aligned on the same rotational axis. It will be thus, appreciated that, during pivotal movement of the head mounting member 19 about the rotational pins 102, the electric communication between the connectors 20a and 20b is constantly established.

Each bearing member 100, as shown in FIGS. 9 and 10, further has an engaging portion 110 formed on its upper portion for positioning the recording roller 17 and locking the cover 49 (see FIG. 1). The engaging portion 110 includes a first positioning surface 110a vertically extending to face the recording head 16 and a protrusion 110b extending upward from the first positioning surface 110a. The protrusion 110b has a second positioning surface 110c formed on its lower surface which is inclined at a given angle to the first positioning surface 110a. The first and second positioning surfaces 110a and 110c engage through a cylindrical bearing 114 a support shaft 112 supporting the recording roller 17 to hold the recording roller 17 in its place when the recording head 16 rotates about the rotational pins 102 to urge the recording roller 17 in a clockwise direction, as viewed in the drawing. Additionally, the engaging portion 110 has an inclined surface 110d formed on its upper end and a guiding surface 110e extending perpendicular to the first positioning surface 110a. The inclined surface 110d guides movement of the support shaft 112 of the recording roller 17 over the protrusion 25b when the cover 49 is closed. The guiding surface 110e guides the support shaft 112 of the recording roller 17 when the cover 49 is closed to set the recording roller 17 in its place. When the cover 49 is fully closed, the support shaft 112 of the recording roller 17 is urged by the recording head 16 into constant engagement with the first and second positioning surfaces 110a and 110c through the cylindrical bearing 114.

Figure 13:
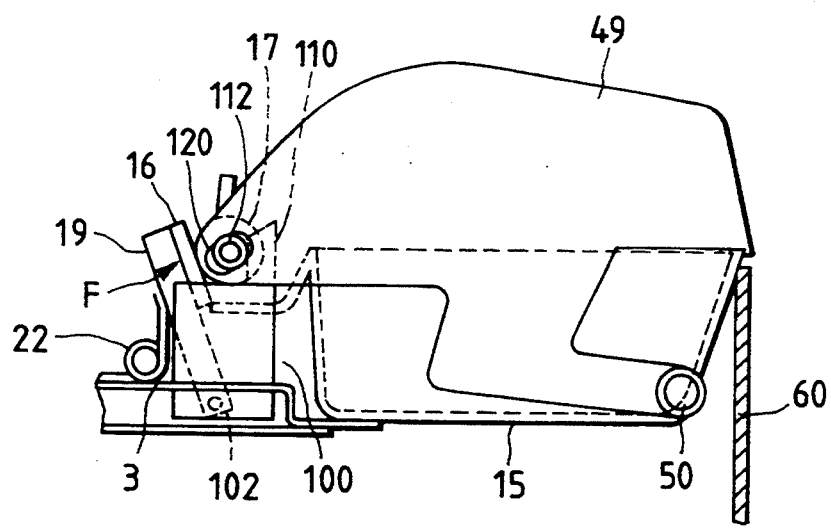
FIG. 13 is an illustration which shows a cover 49 when closed fully.
Figure 15:
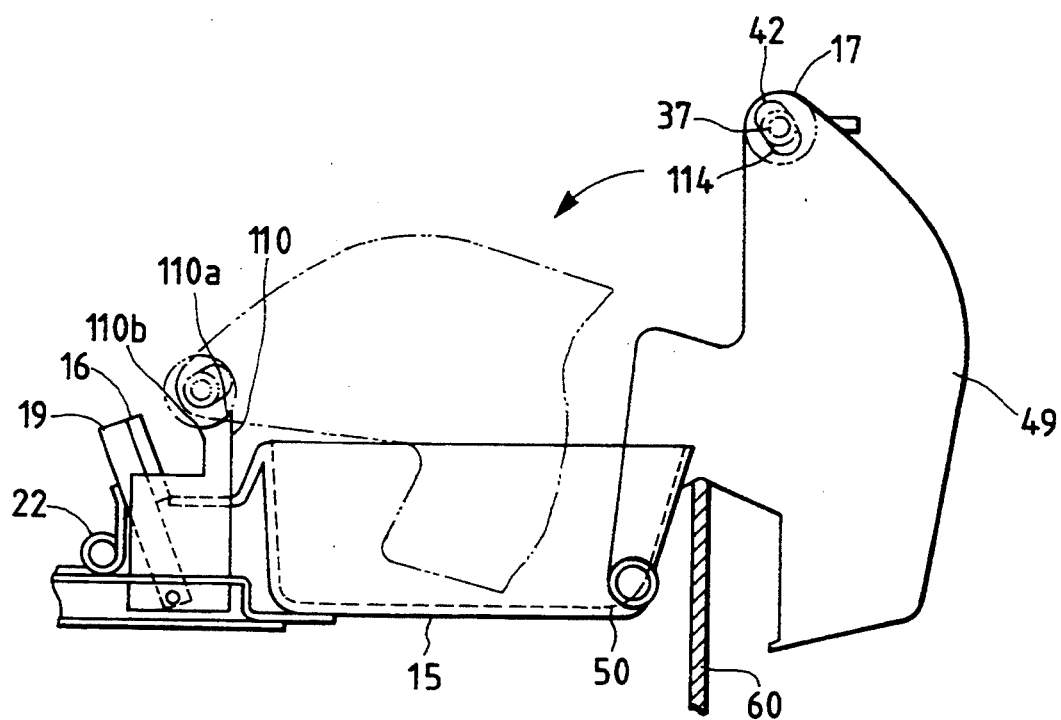
FIG. 15 is an illustration which shows a cover 49 when opened fully.

The cover 49, as mentioned above, is pivotably movable with respect to the shaft 50 between a closed position, as shown in FIG. 13 and an open position, as shown in FIG. 15, and supports the recording roller 17 on its top end portion. The recording roller 17 is retained in elongated holes 120 (only one is shown) through the cylindrical bearing 114 on the support shaft 112 so that it is allowed to be displaced slightly within the elongated holes 120. Each elongated hole 120, as can be seen in FIG. 13, extends in a direction substantially parallel to the pivotal movement of the recording head 16.

Figure 14:
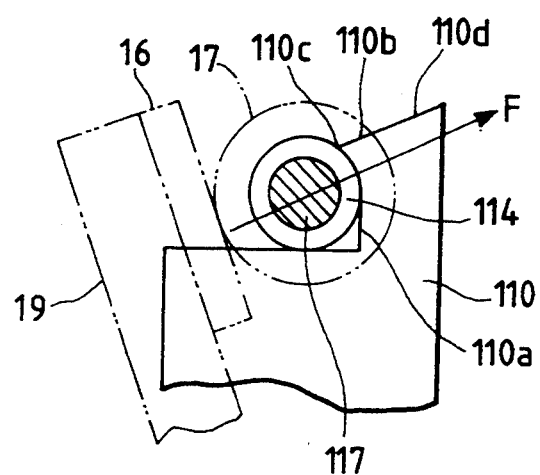
FIG. 14 is a partial view which shows a bearing member retaining a recording roller on a recording head.

When the cover 49 is closed, as shown in FIG. 15, from the open position to the closed position, as shown by a broken line, the cylindrical bearing 114 of the recording roller 17 first contacts the inclined surface 110d of the engaging portion 35. Further closing the cover 49 causes the cylindrical bearing 114 to be displaced within the elongated holes 120 while sliding along the inclined surface 110d. Upon passing over the protrusion 110b, the recording roller is brought into constant engagement with the recording head 16, as shown in FIG. 13. The recording head 16 is elastically urged by the spring 22 in a direction F. Thus, the cylindrical bearing 114 on the support shaft 117, as shown in FIG. 14, is pressed against the first and second positioning surfaces 110a and 110c of the engaging portion 110 so that the recording roller 17 is held in place on the recording head 16. In addition, the support shaft 117 is fixedly retained through the cylindrical bearing 114 on the bearing member 100 for locking the cover 49 in the closed position during facsimile image recording operation with the recording head 16.

When the cover 49 is lifted up strongly about the shaft 50 from the closed position, it will cause the support shaft 117 of the recording roller 17 retained by the engaging portion 35 of the bearing member 100 to move over the protrusion 110b, thereby allowing the cover 49 to be opened to the fully open position, as shown in FIG. 15. The protrusion 110b is geometrically defined so as to prevent the supporting shaft 112 of the recording roller 17 from easily moving thereover into disengagement from the engaging portion 110 during the facsimile image recording operation, while allowing the supporting shaft 112 to be disengaged from the engaging portion 110 under a preselected degree of force required for lifting up the cover 49 to open it. It is desirable that the amount of projection of the protrusion 110b be on the order of 1 to 3 mm.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, in the above embodiment, the recording head 16 is pivotably supported about the rotational pins 102. It should be noted however, that the present invention is not limited to same and that the recording head 16 may be designed to be displaced linearly in the direction F, as shown in FIG. 15.

What is claimed is:

1. A facsimile apparatus comprising:
   a casing having first and second side walls and a bottom wall, the first and second side walls being arranged opposite each other;
   a recording paper storage chamber in which a recording sheet of paper is disposed, said recording paper storage chamber being defined adjacent the first side wall within said casing;
   an optical system for reading facsimile data of a transmit document, said optical system being disposed in a space defined, on the bottom wall of said casing, across said recording paper storage chamber from the first side wall of said casing in a direction from the first side wall to the second side wall;
   a control unit for controlling a facsimile operation, said control unit being disposed over said optical system; and
   a document feeding path for feeding the transmit document to a reading station where said optical system reads the facsimile data of the transmit document, said document feeding path being defined over said optical system toward the second side wall of said casing.

2. A facsimile apparatus as set forth in claim 1, further comprising a recording head pivotably mounted on a control board of said control unit.

3. A facsimile apparatus as set forth in claim 1, further comprising an opening and closing member, arranged above said control unit, for opening and closing said casing and detecting means, mounted on a control board of said control unit, for detecting position of said opening and closing member.

4. A facsimile apparatus as set forth in claim 1, wherein the space having said optical system disposed therein is defined from the second side wall of said casing to be beneath said recording paper storage chamber.

5. A facsimile apparatus as set forth in claim 1, further comprising a power circuit disposed beneath said recording paper storage chamber.

6. A facsimile apparatus as set forth in claim 5, wherein the space having said optical system disposed therein is defined from the second side wall of said casing to said power circuit.

7. An facsimile apparatus as set forth in claim 1, wherein said optical system includes a light source.

8. A facsimile apparatus comprising:
a casing having first and second side walls arranged opposite each other;
a recording paper storage chamber in which a recording sheet of paper is disposed, said recording paper storage chamber being defined adjacent the first side wall within said casing;
a control board disposed within a space defined across said recording paper storage chamber from the first side wall of said casing in a direction from the first side wall to the second side wall;
a document feeding path for feeding a transmit document, said document feeding path being defined over said control board toward the second side wall of said casing; and
detecting means, provided on said control board, for detecting the presence of the transmit document traveling along said document feeding path.

9. A facsimile apparatus as set forth in claim 8, wherein said detecting means further detects position of an opening and closing member for opening and closing said casing.

10. A facsimile apparatus as set forth in claim 8, wherein a base plate is provided for suspending said control board, said detecting means including an actuator, arranged on said base plate, movable in response to movement of the transmit document along said document feeding path for detecting the presence of the transmit document on said document feeding path.

11. A facsimile apparatus comprising:
a casing having first and second side walls arranged opposite each other;
a recording paper storage chamber in which a recording sheet of paper is disposed, said recording paper storage chamber being defined adjacent the first side wall within said casing;
a control board disposed within a space defined across said recording paper storage chamber from the first side wall of said casing in a direction from the first side wall to the second side wall;
a base plate mounted in said casing for suspending said control board;
moving means, arranged on said base plate, for moving in response to movement of an opening and closing member which opens and closes said casing and to traveling of a sheet of paper along a paper feeding path; and
detecting means, responsive to the movement of said moving means, for detecting position of the opening and closing member and the presence of the sheet of paper on the paper feeding path.

12. A facsimile apparatus comprising:
a casing having first and second side walls arranged opposite each other;
a recording paper storage chamber in which a recording sheet of paper is disposed, said recording paper storage chamber being defined adjacent the first side wall within said casing;
a control board disposed within a space defined across said recording paper storage chamber from the first side wall of said casing in a direction from the first side wall to the second side wall;
a cover, arranged above said control board, supported by said casing to be movable between an opening position where said casing is opened and a closed position where said casing is closed; and
detecting means, arranged on said control board, for detecting a position of said cover between the opening position and the closed position to provide a signal indicative thereof.

13. A facsimile apparatus comprising:
a casing having first and second side walls and a bottom wall, the first and second side walls being arranged opposite each other;
a recording paper storage chamber in which a recording sheet of paper is disposed, said recording paper storage chamber being defined adjacent the first side wall within said casing;
an optical system for reading facsimile data of a transmit document, said optical system being disposed in a space defined, on the bottom wall of said casing, across said recording paper storage chamber from the first side wall of said casing in a direction from the first side wall to the second side wall;
a unit including a base plate having disposed thereon a preselected component part of the facsimile apparatus and a control board on which a preselected electronic part associated with said component part of the facsimile apparatus, said unit being disposed over said optical system;
a document feeding path for feeding the transmit document to a reading station where said optical system reads the facsimile data of the transmit document, said document feeding path being defined over said optical system toward the second side wall of said casing.

14. A facsimile apparatus as set forth in claim 13, further comprising a roller for feeding the transmit document along said document feeding path.

15. A facsimile apparatus as set forth in claim 13, further comprising moving means, arranged on said base plate, for moving in response to traveling of the transmit document along said document feeding path and detecting means, arranged on control board, responsive to the movement of said moving means, for detecting the presence of the transmit document on said document feeding path.

* * * * *